United States Patent [19]

Boe et al.

[11] Patent Number: 4,969,527
[45] Date of Patent: Nov. 13, 1990

[54] HITCH CONTROL SYSTEM

[75] Inventors: Thomas E. Boe; Vijay M. Dharia; David J. Easton, all of Cedar Falls, Iowa

[73] Assignee: Deere & Company, Moline, Ill.

[21] Appl. No.: 435,861

[22] Filed: Nov. 13, 1989

[51] Int. Cl.$^5$ .................. A01B 63/112; A01B 63/114
[52] U.S. Cl. .......................... 172/7; 172/2; 364/424.05
[58] Field of Search ............... 172/2, 4, 4.5, 7; 200/43.01; 37/DIG. 1; 364/424.05

[56] References Cited

U.S. PATENT DOCUMENTS

| | | | |
|---|---|---|---|
| 4,132,273 | 1/1979 | Mortonson et al. | 172/7 X |
| 4,343,365 | 8/1982 | Rajagopal et al. | 172/4 |
| 4,495,577 | 1/1985 | Strunk et al. | 172/7 X |
| 4,508,176 | 4/1985 | Wiegardt et al. | 172/7 |
| 4,518,044 | 5/1985 | Wiegardt et al. | 172/7 |
| 4,677,542 | 6/1987 | Kasten | 364/150 |
| 4,817,499 | 4/1989 | Bellanger et al. | 172/2 X |
| 4,837,691 | 6/1989 | Boe et al. | 364/424.05 |

OTHER PUBLICATIONS

Deere & Company, "Rockshaft and Three Point Hitch-Operators Manual", OM-RW25630, pp. 50-1 to 50-14, 1989.
Massey-Ferguson, "Hydraulic Lift-MF3600 Massey Ferguson-Operator Instruction Book", pp. 40-43 and 48, 1987.

Primary Examiner—Randolph A. Reese
Assistant Examiner—Jeffrey L. Thompson

[57] ABSTRACT

A hitch control system includes various sensors, an operator command lever, a spring-centered three position raise/lower switch, a control unit which generates control signals as a function thereof and an actuator which moves the hitch in response to the control signals. The control system permits the operator to move the hitch to a working position via manipulation of the command and a single manipulation of the raise/lower switch. The control system ignores switch manipulation unless the manipulation persists for at least a certain time period, or if the switch is manipulated in a different manner within a certain time of the earlier manipulation. In a failure mode the control system permits the hitch to be moved to a working position via manipulation of the raise/lower switch when the command lever cannot be so used.

7 Claims, 15 Drawing Sheets

Microfiche Appendix Included
(2 Microfiche, 167 Pages)

HITCH CONTROL SYSTEM

BACKGROUND OF THE INVENTION

This application includes a microfiche appendix including 2 microfiche and 167 frames.

A portion of the disclosure of this patent document contains material which is subject to a claim of copyright protection. The copyright owner has no objection to the facsimile reproduction by anyone of the patent document or the patent disclosure as it appears in the Patent and Trademark Office patent file or records, but otherwise reserves all other rights whatsoever.

This invention relates to a control system for controlling the working depth of a tractor-coupled implement as a function of various sensed and operator-controlled parameters.

Various electrohydraulic hitch control systems have been designed and built or proposed. Various attempts have been made to improve hitch control system performance utilizing electronics and/or microprocessors. See, for example, U.S. Pat. Nos. 4,508,176; 4,518,004; 4,503,916 and 4,837,691. However, such systems utilizing electronics have not generally been fully utilized due to factors such as complexity of the operator controls. A known production hitch control system, such as provided with John Deere tractors, includes a rockshaft control lever which is movable to raise and lower the hitch under certain conditions and to set implement working depth. This known system also includes a cab mounted raise/lower switch. When the cab switch is in the "down" position, the control system operates to control implement depth around the working depth set by the control lever and the control system responds to changes in the setting of the control lever. When the cab switch is in the "up" position the setting of the control lever has no influence and the hitch and implement are moved to their fully up positions. In this system, if there is a failure of the rockshaft lever potentiometer, then the control system will lock the hitch and implement at their current position. If there is a failure of the hitch position feedback potentiometer, then the "up" position of the cab switch may cause the hitch to move to its fully up position and the "down" switch position may cause the hitch to move to its fully lowered position. This known production system also includes an external switch mounted on the rear of the tractor near the hitch. This external switch can be manipulated to raise or lower the hitch to any position desired by the operator. The cab switch is a two-position detent held type switch and the external switch is a three position switch, spring biased to its center position.

Another known production hitch control system, such as is available with the Massey-Ferguson tractors, includes a rockshaft control knob which sets the implement working depth and a three-position detent held lift/lowering switch with up, down and neutral positions. This system operates similar to the previously described system when the three-position switch is in its "up" and "down" positions. However, when the three-position switch is in its "neutral" or center position, then the control system is disabled, hitch movement is prevented and the system does not respond to movement of the rockshaft control knob. In both of these known systems, the raise/lower switches are detent-held type switches which remain in whatever position they are placed in until intentionally moved out of such position. With either of these known hitch control systems, to raise or lower the hitch to a desired position with the control lever/knob requires a correct combination of control settings. The raise/lower switch must be in its down position or the control lever will not function. A failure of this switch in the up position can disable the function of the control lever. It would be desirable to provide a hitch control system which requires fewer operator actions, and which has other performance advantages made possible by electronics.

SUMMARY OF THE INVENTION

An object of the present invention is to provide a hitch control system with simple operator controls and improved performance utilizing a microprocessor.

Another object of the present invention is to provide such a hitch control system wherein during certain failure conditions the hitch can be moved to a working depth via manipulation of the cab mounted raise/lower hitch.

Another object of the present invention is to provide a hitch control system with a rockshaft control lever and a separate cab mounted raise/lower switch wherein simplified operator actions are required.

These and other objects are achieved by the present invention wherein a hitch control system includes sensors such as draft force and hitch position sensors, an operator controlled command lever and a cab-mounted spring-centered, three-position raise/lower rocker switch, all connected to an electronic control unit (ECU). The ECU generates control signals which are applied to electrohydraulic valves which control the hydraulic fluid supplied to cylinders which raise and lower the hitch as a function of sensed parameters, operator control inputs and sensed failure conditions. For example, when the rocker switch is momentarily placed in its down position, the control system will normally move the hitch to the position represented by the command lever only if the lever position is below the sensed position of the hitch. A "lever lock-out" mode is disabled so that later the hitch working position/depth can be adjusted by adjustment of the command lever. If the command lever is above the sensed hitch position, the "lever lock-out" mode is enabled and hitch movement is prevented.

If the rocker switch is momentarily placed in its up position and then released, the switch will automatically return to its center position and the control system will normally move the hitch to its fully raised position, as defined by the setting of a position limit setter, then the "lever lock-out" mode will be enabled to prevent further hitch movement. "Lever lock-out" mode continues until the command lever is moved to its full-back or up position (matching the hitch position), or to its full forward or down position, whereupon the "lever lock-out" mode is disabled so as to permit the hitch position to be adjusted by movement of the command lever. No additional manipulation of the rocker switch is required.

If the rocker switch is placed in its up position while the "lever lock-out" mode is enabled and the command lever is above the hitch position, the hitch will be raised to its full up position and the "lever lock-out" mode will remain enabled.

The control system includes a cancel feature wherein the effect of a momentary up or down rocker switch movement will be cancelled by a subsequent movement of the rocker switch in the opposite direction within a certain time period, such as two seconds. Also, in this event, the hitch will be held in its present position. Holding the rocker switch in its second position for at least one second or releasing and moving it again to this second position will override the cancel feature and cause the system to respond as if the rocker switch were merely placed in the second position. Also, switch manipulations which persist for less than a certain time period are ignored.

The control system includes a "limp-home" mode wherein if either the command lever transducer or the hitch position sensor suffers a failure (such as a short or open circuit condition) then the hitch can be moved up or down by pressing the rocker switch up or down, respectively, and the hitch will stop moving when the rocker switch is released.

BRIEF DESCRIPTION OF THE DRAWINGS

FIGS. 3a–3l are flow charts of the algorithm performed by the microprocessor of FIG. 2.

DETAILED DESCRIPTION

Figure 1:
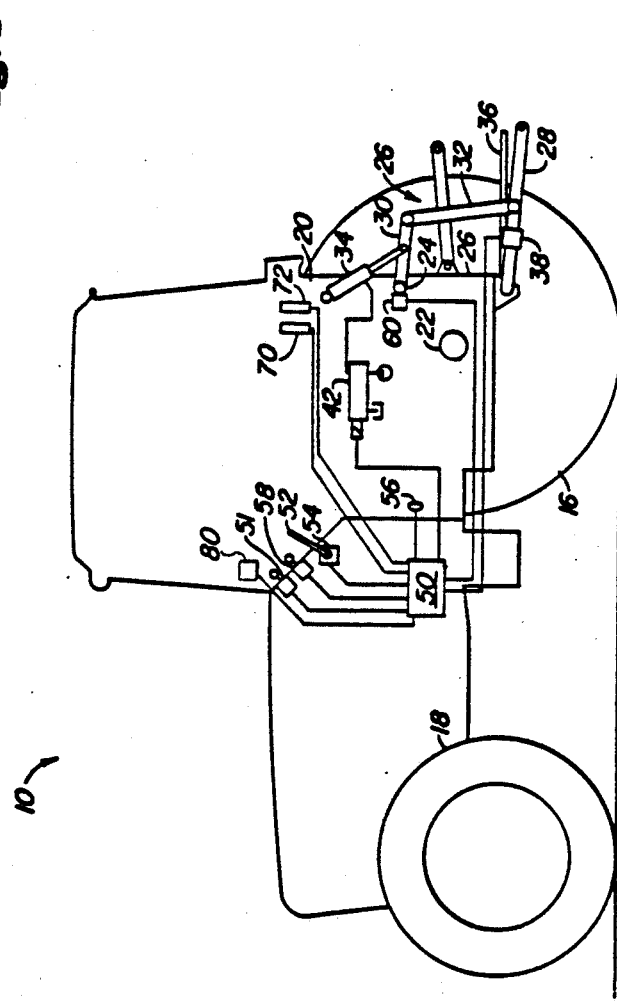
FIG. 1 is a simplified schematic of an agricultural tractor equipped with the present invention.

A tractor 10 includes a rear housing 20 which supports a rear axle 22 and rockshaft 24. An implement hitch 26, such as a conventional 3-point hitch, includes draft links 28 which are connected to lift arms 30 via lift links 32. The lift arms 30 are connected to the rockshaft 24 to insure simultaneous and equal movement, and are raised and lowered via a pair of parallel connected hydraulic lift or rockshaft cylinders 34. A drawbar 36 extends rearwardly from the housing 20. The tractor 10 and the hitch 26 are merely exemplary and those skilled in the art will understand that the invention can be applied to tractors and hitches of other configurations. For example, this invention can be used on an articulated four-wheel drive tractor, on a front-wheel drive row-crop tractor or on a front mounted hitch.

An integral-type, ground-engaging implement (not shown), such as a moldboard plow or a chisel plow, may be attached in a conventional manner to the draft links 28. Alternatively, a towed implement (not shown) may be coupled to the drawbar 36. A draft sensor 38 is interposed in a strap (not shown) which is inserted in place of the hydraulic draft force sensing cylinder of the conventional hydromechanical hitch system to sense the draft force transmitted to the draft links 28 from the integral implement. Alternatively, separate left and right draft sensors could be inserted in the left and right draft links 28, and the signals therefrom electronically combined or averaged. In the case of a towed implement, the draft force may be sensed with a draft sensor interposed in the drawbar 36, or with a T-bar coupled to the draft links. In either case, any suitable known draft sensor would suffice, such as the Model GZ-10 manufactured by the Revere Corporation of America.

The communication of hydraulic fluid to and from the cylinder 34 or to and from a remote cylinder (not shown) on a towed or semi-integral implement is controlled by a pair of solenoid-operated electrohydraulic flow control valves 42a and 42b which receive electrical control signals generated by a control unit 50. The flow control valves 42 could be such as described in U.S. Patent Appln. Ser. No. 145,345, filed 19 January 1988 which is incorporated by reference herein or other commercially available valves.

An operator-controlled command lever 52 (or control knob) is coupled to a lever transducer 54 (such as a potentiometer) which generates a command signal which represents a desired hitch position or a desired draft load, or a combination thereof, depending upon the setting of a load/depth or mix control potentiometer 56. An electrical upper position limit signal is provided by an operator-adjustable potentiometer 51. The lever 52 moves within a slot (not shown). The ends of this slot act as lower and upper mechanical stops, respectively, which mechanically limit the position of control lever 52, and thus limit the signal from potentiometer 54. Also provided is an operator-adjustable drop rate potentiometer 58.

A position transducer 60, such as a conventional rotary potentiometer, generates a sensed position signal which represents the actual sensed position of the rockshaft. A position feedback signal could also be obtained from the lift cylinder 34 or from a remote lift cylinder if that cylinder includes a position transducer, such as described in U.S. Pat. No. 3,726,191, for example.

Also, a double pole, double throw raise/lower switch 70 may be mounted outside of the tractor cab near the hitch 26 so that an operator can raise and lower the hitch from outside of the tractor cab. A calibration switch 72 is mounted inside the tractor cab, but is not part of the present invention.

Figure 4:
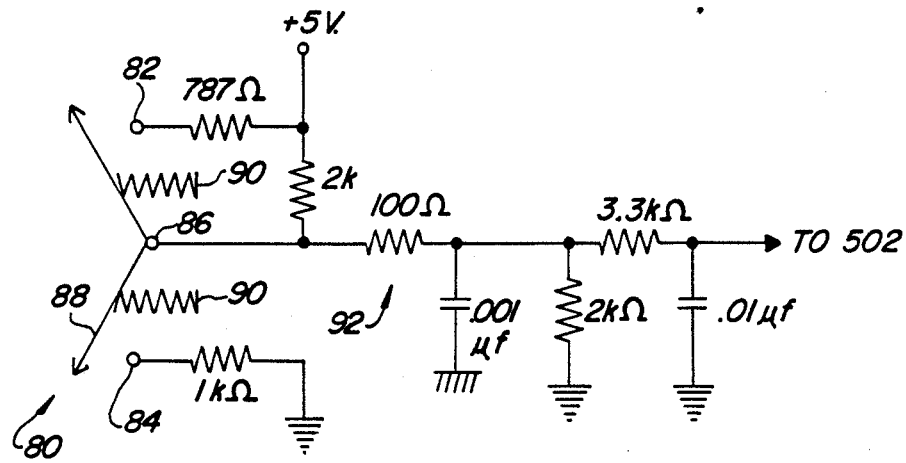
FIG. 4 is a detailed electrical schematic diagram of the cab-mounted, spring centered rocker switch of the present invention.

The control system also includes a cab-mounted raise/lower switch 80. However, in contrast to the cab-mounted raise/lower switches in the prior art systems, the raise/lower switch 80, as best seen in FIG. 4, is a spring centered, three-position rocker switch with up terminal 82, down terminal 84, a common or neutral terminal 86, and a pivotal contact element 88. A pair of centering springs 90 return the contact element 88 to its center position spaced apart from terminals 82 and 84 when it is not manually held in contact with either terminal 82 or 84. Down terminal 84 is grounded through a resistor. Up terminal 82 and common terminal 86 are coupled to a voltage source and to the A/D converter 502 via an impedance network 92 so that the voltage communicated to the A/D converter 502 from switch 80 will be indicative of the position of switch 80.

Figure 2:
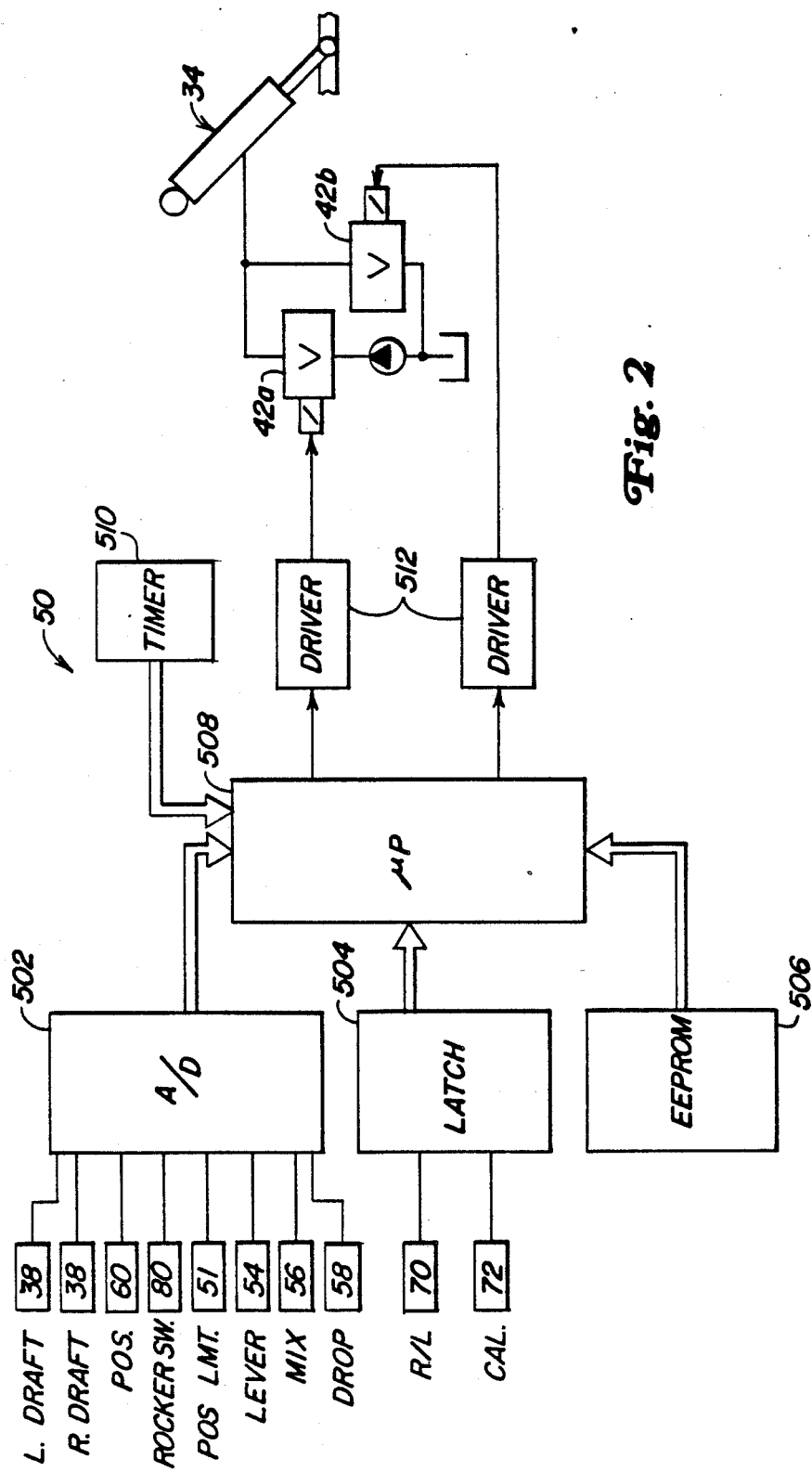
FIG. 2 is an electrical and hydraulic schematic diagram of a hitch control system including the present invention.

Referring now to FIG. 2, the control unit 50 preferably includes an analog-to-digital converter 502, a latch 504, an electrically erasable, programmable read only memory (EEPROM) 506, a microprocessor 508 with an integral timer (not shown) and a pair of valve drivers 512. The valve drivers could be any conventional pulse-width modulated valve current driver, but preferably are such as described in U S. patent application, Serial No. 294,527 filed 6 January 1989 file 13559). The analog signals from sensors/potentiometers 38, 51, 54, 56, 58 and 60 and from switch 80 are coupled to the microprocessor 508 via analog-to-digital converter 502. Latch 504 couples raise/lower switch 70 and calibration switch 72 to microprocessor 508. EEPROM 506 stores calibration data used in a calibration method which forms no part of this invention.

A rocker switch subroutine illustrated by the logic flow diagrams of FIGS. 3a–3l is executed periodically by the control unit 50. The control unit 50 preferably executes a lock-out algorithm as described in U.S. Pat.

No. 4,837,691 and a main hitch control program such as described in U.S. Pat. No. 4,518,044, both incorporated by reference herein. According to the present invention, the control unit 50 executes the rocker switch subroutine each time the main program is executed. For further details concerning the rocker switch subroutine and the entire hitch control program of which the rocker switch subroutine is a part, the reader is referred to the computer program listing contained in the microfiche appendix.

The three-way rocker switch subroutine is entered at step 100 each time the main program is executed. If a failure bit has previously been set to represent a failure condition of the rocker switch 80, step 102 directs the algorithm back to the main program via step 104. If the failure bit has not been set then step 102 directs the algorithm to steps 106–110. Step 106 decrements a 2-second timer. Steps 108 and 110 operate to clear a 2-second timer bit when the 2-second timer has timed out. Otherwise, step 108 directs the algorithm to step 112 which obtains and stores the current status of the rocker switch 80 as an A/D value and directs the algorithm to step 114.

In steps 114 through 120 this A/D value is compared to a series of reference values to determine the current rocker switch position and to determine whether a failure condition has occurred. For example, step 114 directs the algorithm to step 122 upon the occurrence of a grounded terminal failure condition. Step 116 directs the algorithm to step 126 if the rocker switch is now in the down position. Step 118 directs the algorithm to step 180 if the switch is now in the center position. Step 120 directs the algorithm to step 200 if the switch is in the up position. Finally step 120 will direct the algorithm to step 122 if one of the switch terminals has high voltage failure condition. Thus, if a failure condition occurs the algorithm will be directed to step 122.

Figure 3A:
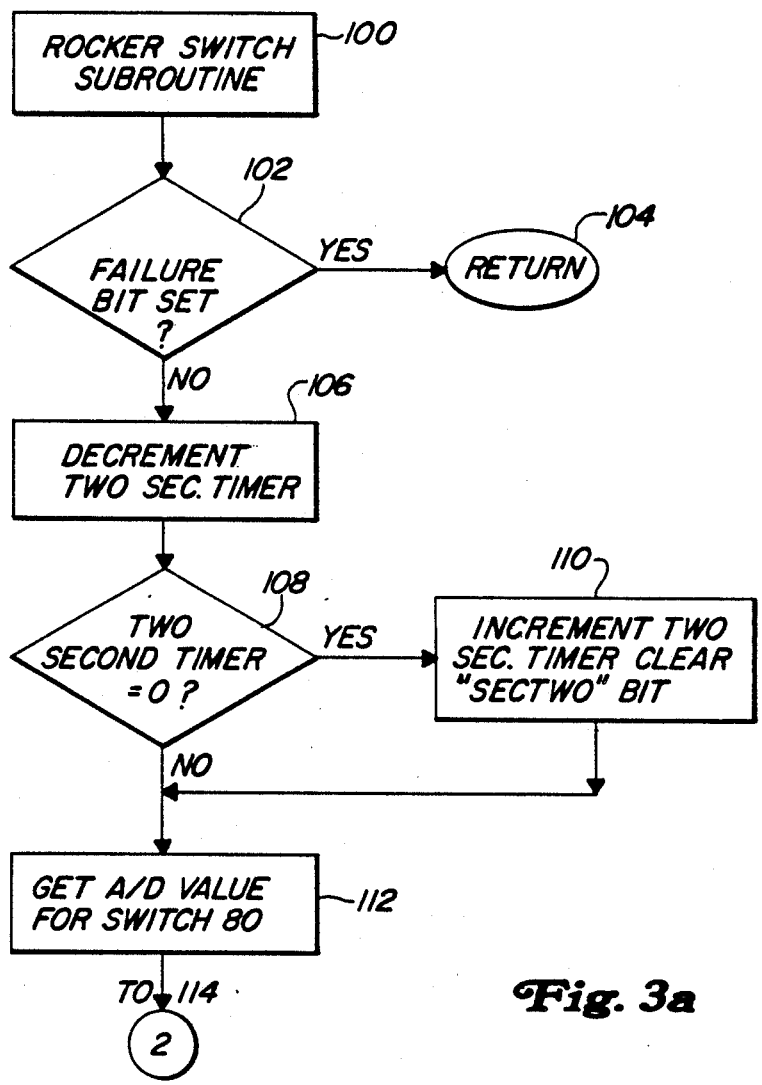
Figure 3B:
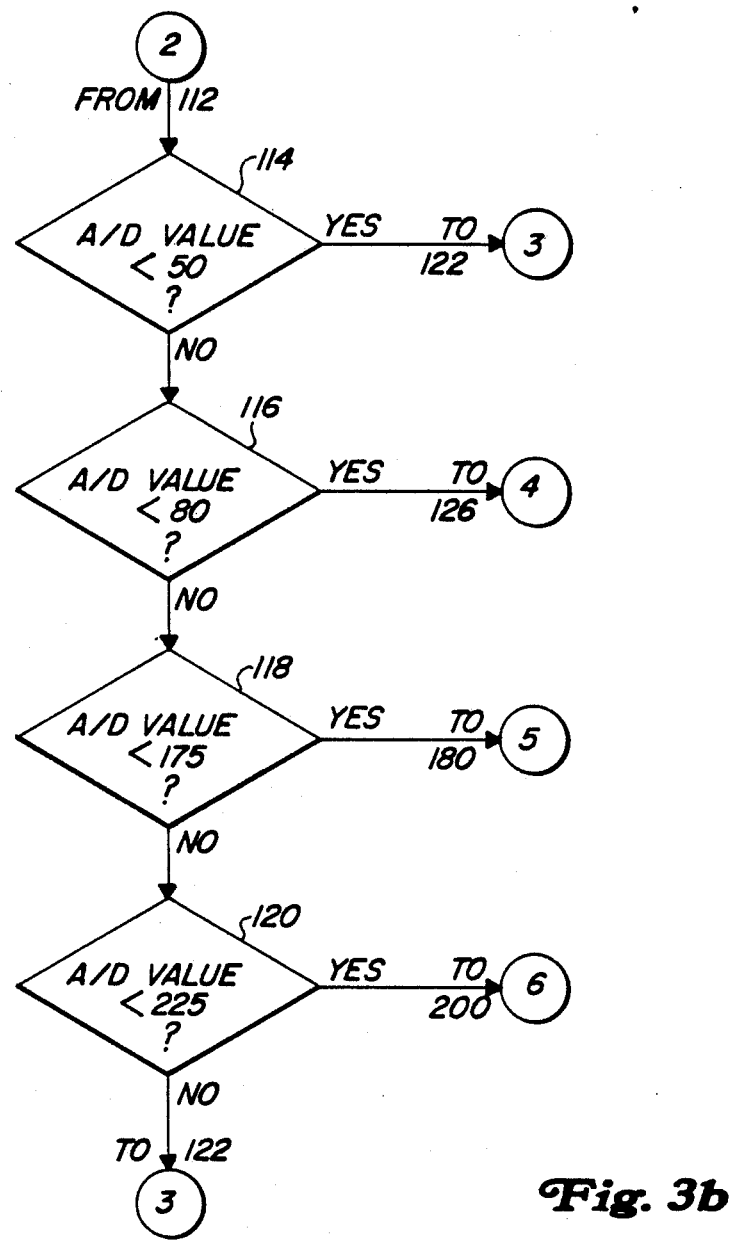
Figure 3C:
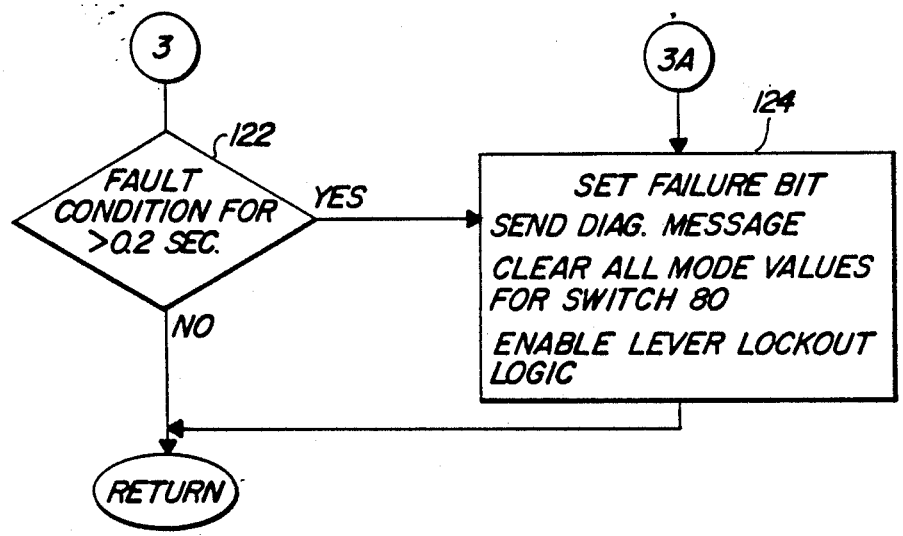

Referring now to FIG. 3c, if this failure condition persists for .2 seconds then step 122 will direct the algorithm to step 124. If the failure condition does not persist for at least .2 seconds then step 122 will cause a return to the main program. Step 124 sets a hard failure bit, generates a diagnostic message, clears all modes of the rocker switch 80 and enables lever lock-out logic.

Figure 3D:
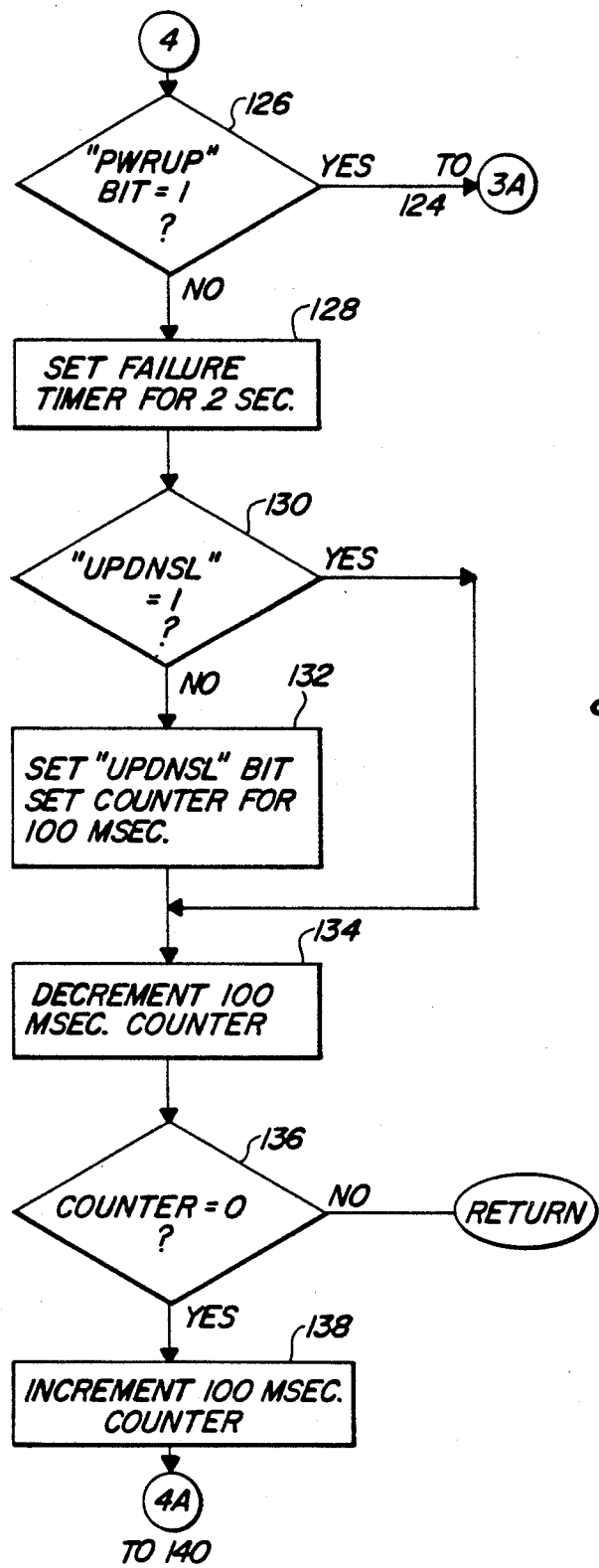

Referring now to FIG. 3d, step 126 (which is reached when the rocker switch is in its down position) directs the algorithm to the fault condition logic of step 124 if a power-up bit is set equal to 1 indicating that the switch 80 was in the down position when power was first applied to the system. If the PWRUP bit is not set equal to 1, then step 126 directs the algorithm to step 128 which sets a failure timer for .2 seconds. This resets the fault timer used in step 122. Then steps 130 and 132 operate to set a UPDNSL bit and to set a counter for a 100 millisecond time period if this is the first time through the algorithm that the rocker switch has been in the down position. Steps 134 and 136 operate to return the algorithm to the main program if the rocker switch has not been held down for at least 100 milliseconds. If the rocker switch has remained in its down position for at least 100 milliseconds, then step 136 directs the algorithm to step 138 which increments the 100 millisecond counter and directs the algorithm to step 140.

Figure 3E:
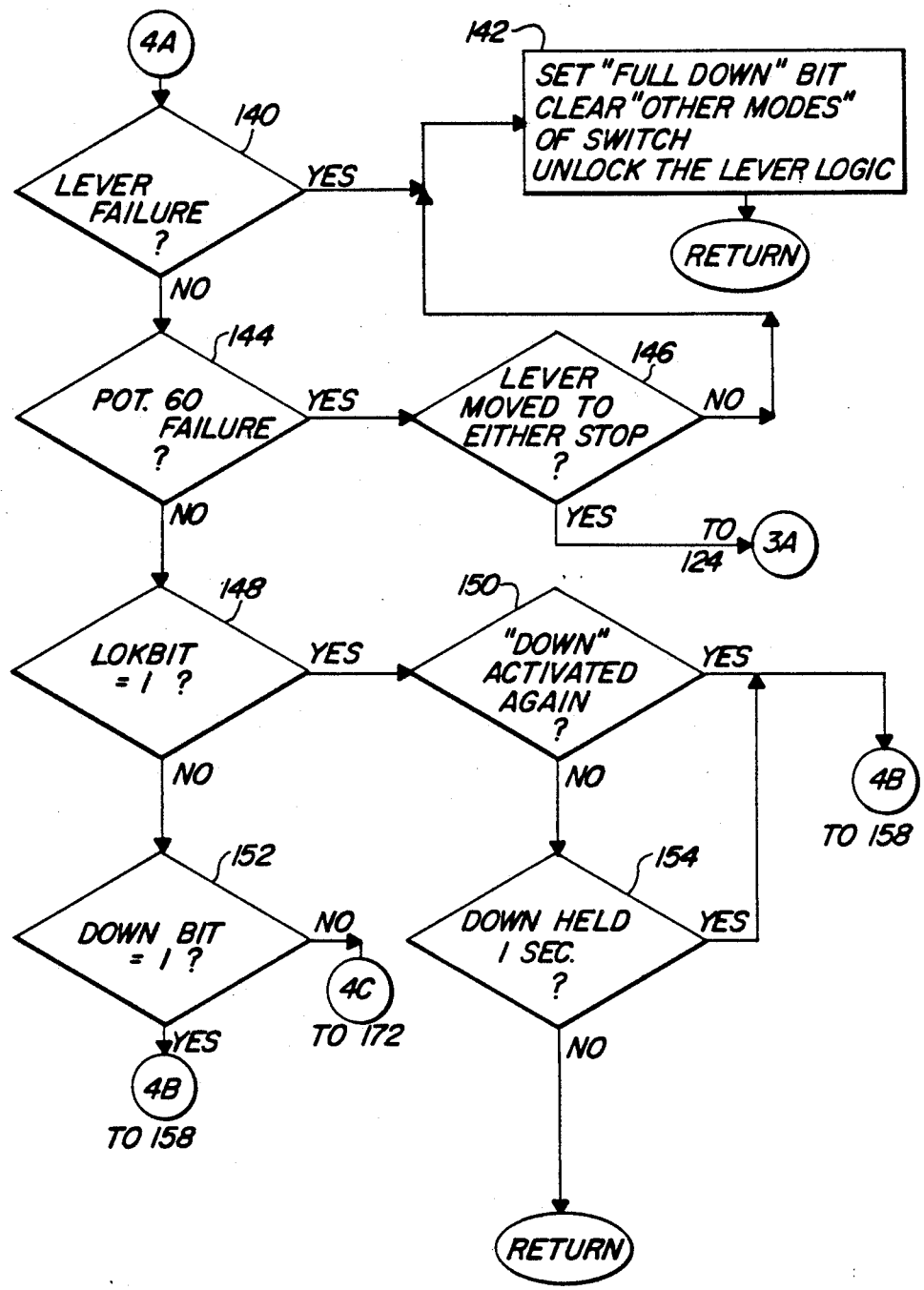

Referring now to FIG. 3e, step 140 directs the algorithm to step 142 if there is a failure of the control lever potentiometer 54. Steps 144 and 146 direct the algorithm to step 142 if there is a failure of the position feedback potentiometer 60 and the lever 52 has not been moved to either stop position. Step 142 sets a "full down" bit, clears the other modes of the rocker switch and unlocks the lever logic (or disable the lever lockout logic) and then returns control to the main program. If step 146 determines that the lever has been moved to either stop position then step 146 directs the algorithm to the failure logic of step 124. If there has not been a failure of the lever potentiometer 54 nor a failure of the feedback potentiometer 60 then the algorithm proceeds from step 144 to 148. Step 148 determines whether the cancel feature has previously been enabled by the setting of a "LOKBIT" value. If the cancel feature has been enabled then step 148 directs the algorithm to step 150. Step 150 directs the algorithm to step 158 if this is the second separate time the switch 80 has been placed in the down position. Otherwise, step 150 directs the algorithm to step 154. Step 154 directs the algorithm to step 158 if the rocker switch is held in the down position for more than one second. Otherwise the algorithm returns to the main program. Returning now to step 148, if the cancel feature was not enabled then step 148 directs the algorithm to step 152. Step 152 determines whether a "down mode" has been selected by examining the value of a "DOWN" bit. If the down mode was selected then step 152 directs the algorithm to step 158. If the down mode was not selected step 152 directs the algorithm to step 172.

Figure 3F:
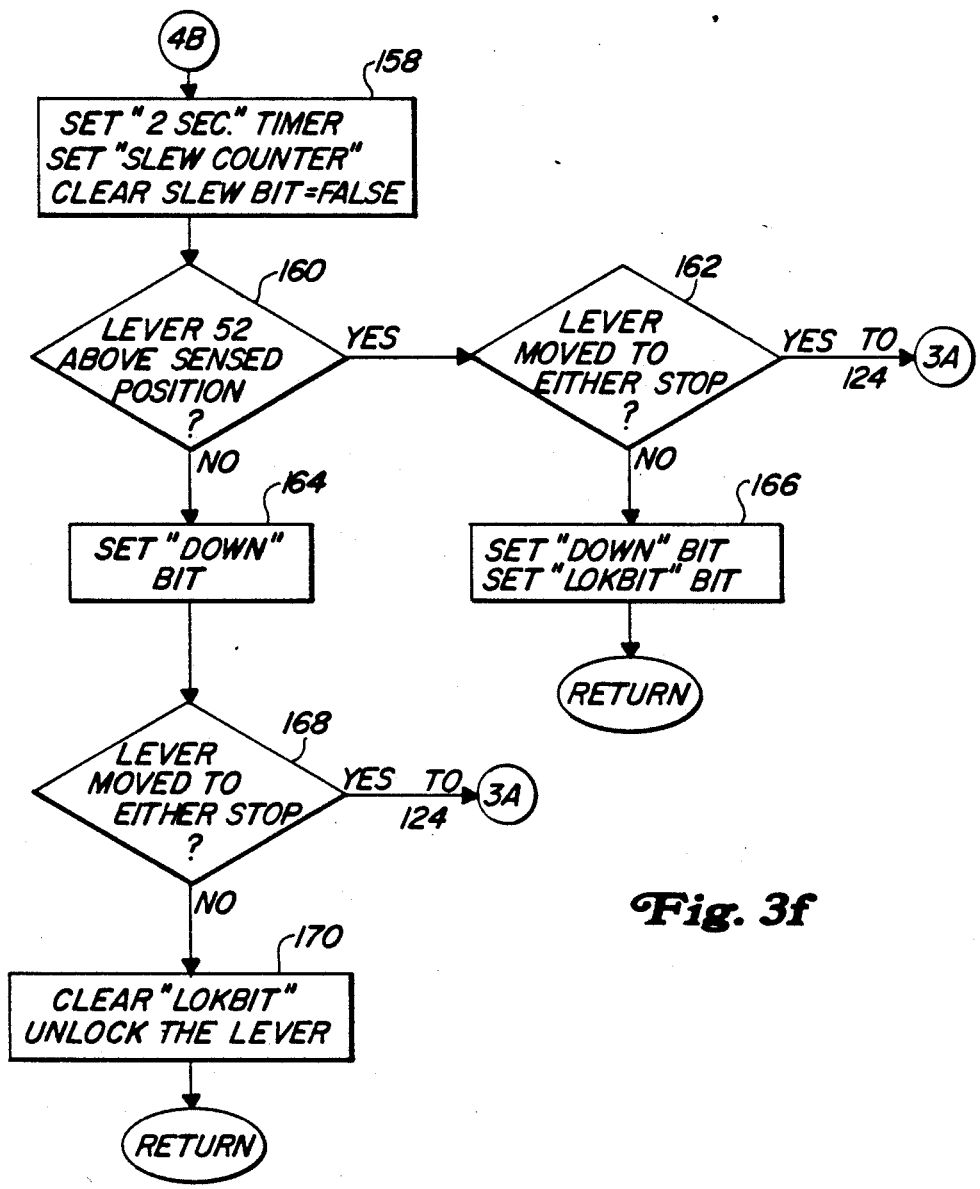

Referring now to FIG. 3f, step 158 is entered if the switch 80 is in the down position and the down mode was previously selected by a prior setting of the DOWN bit such as in steps 164 and 166 or if the cancel feature was requested by steps 148, 150 and 154. Step 158 sets a 2 second timer, sets a slew counter and clears a "SLEW" bit. If the position commanded by lever 52 is above the position sensed by sensor 60 then step 160 directs the algorithm to step 162 and step 162 directs the algorithm to flag a failure in step 124 if the lever 52 has been moved to either of its stop positions. Otherwise, step 162 directs the algorithm step 166 which sets the "DOWN" bit and sets the "LOKBIT" bit. Step 166 then returns control to the main program which responds by preventing the hitch from moving to the commanded position when the rocker switch 80 is in the down position and the commanded position is above the sensed position.

Returning now to step 160, if the position commanded by lever 52 is not above the sensed hitch position then step 160 directs the algorithm to step 164 which sets the "DOWN" bit. Then if step !68 detects that the lever 52 has been moved to either of its stop positions, step 168 directs the algorithm to the failure logic of step 124. Otherwise, step 168 directs the algorithm to step 170 which clears the "LOKBIT" bit (disabling the cancel feature) enables the lever 52 and returns control to the main program. Thus, if the rocker switch is in the down position and the commanded position is below the sensed hitch position, the main program will move the hitch down to the position commanded by the lever 52.

Figure 3G:
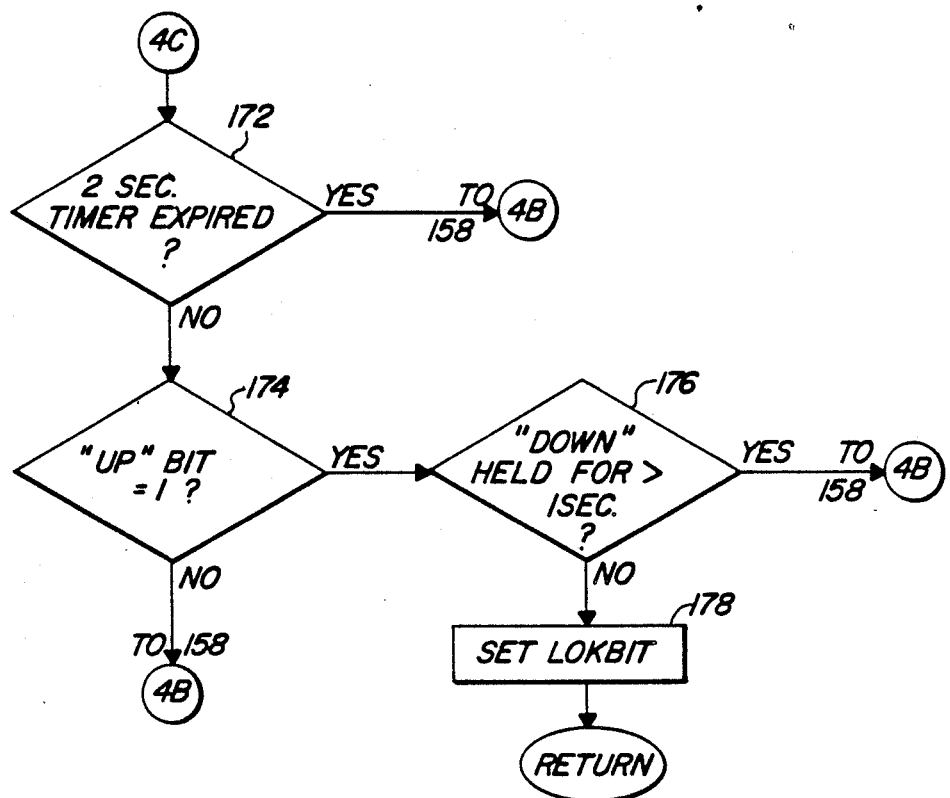

Returning now to step 152, if the down mode had not previously been selected then step 152 directs the algorithm to step 172 (FIG. 3g). Step 172 directs the algorithm to step 158 if the 2 second timer decremented in step 106 has expired. Thus, this causes the down mode to be selected with no test of the previous switch selection, if it has been more than 2 seconds since the last switch action. If the 2 second timer has not expired, then step 172 directs the algorithm to step 174 which examines the value of an "UP" bit. If the UP bit has not been set, then the down mode is selected and the algorithm proceeds to step 158. However, if the UP bit has been set it means that the rocker switch was previously in its up position but within 2 seconds was placed in its down position. In this case step 174 directs the algorithm to step 176 which determines whether or not the switch remains in the down position for more than one second. If the rocker switch remains in the down position for more than one second then step 176 causes the algorithm to proceed to step 158 and the down mode is selected. If the rocker switch is not held in its down position for at least one second, then step 176 directs the algorithm to 178 which sets the LOKBIT bit and enables the cancel feature.

Figure 3H:
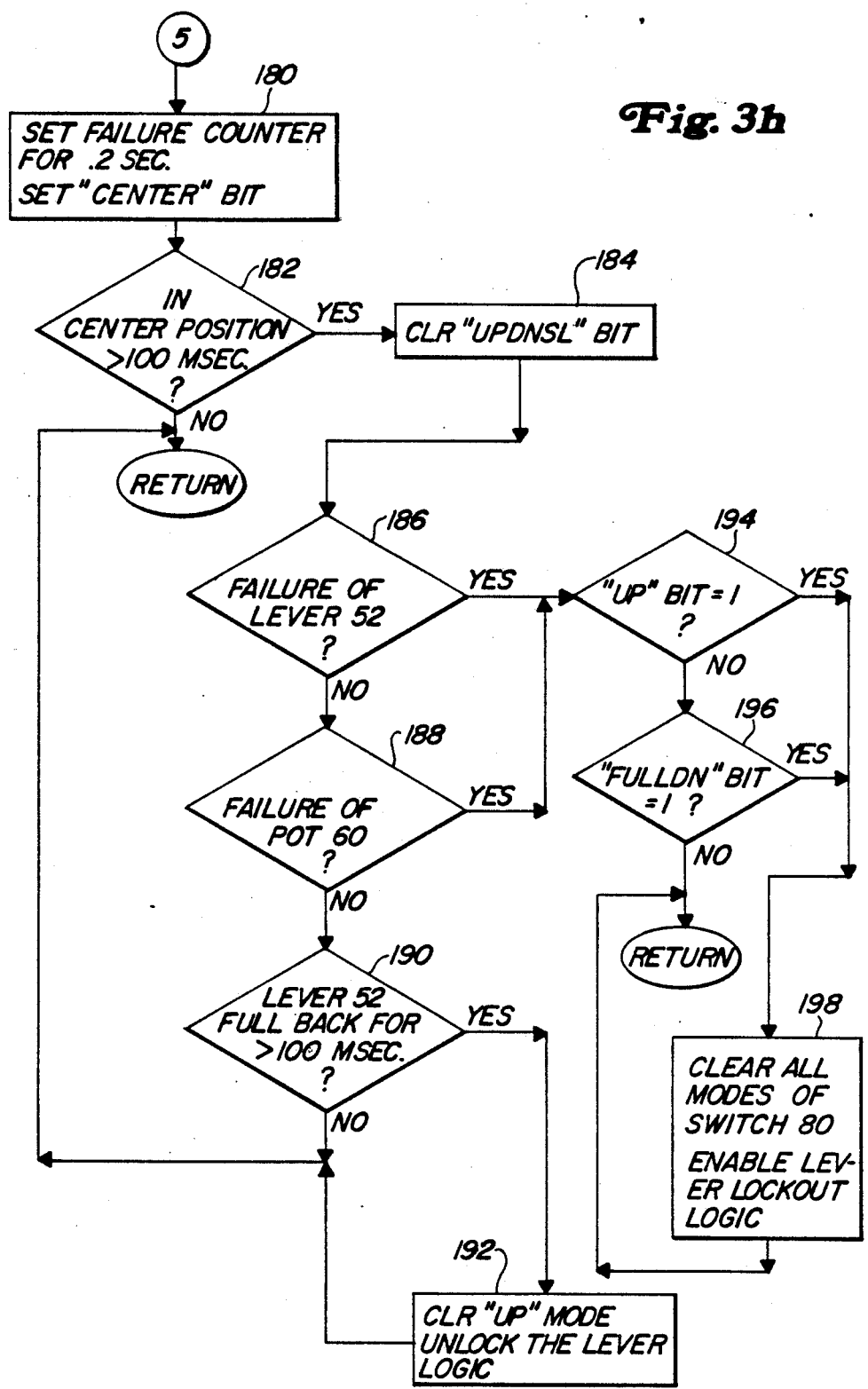

Returning back to FIG. 3b, if step 118 detects that the rocker switch 80 is in its center position then the algorithm is directed to step 180 of FIG. 3h. Step 180 sets a failure counter for a .2 second time period, and sets a center bit indicating that the switch is in its center position. The algorithm then proceeds to step 182 which determines whether or not the switch has been in its center position for at least 100 milliseconds. If the switch has not been in its center position for at least 100 milliseconds, the algorithm returns to the main program. If the rocker switch remains in the center position for at least 100 milliseconds then the step 182 directs the algorithm to step 184. Step 184 clears a "UPDNSL" bit indicating that the switch has been in its center position for more than 100 milliseconds.

Steps 186 and 188 direct the algorithm to step 194 if a failure of either the lever 52 or of the position feedback sensor 60 have occurred. Steps 194 and 196 direct the algorithm to step 198 if the switch had recently been in an up position or previously in a down position. Step 198 clears all the modes of the switch, enables the lever lockout logic to prevent hitch movement in response to movement of the lever 52 and then returns to the main program. If the rocker switch had not recently been in either an up position or a down position then steps 194 and 196 merely return control to the main program.

If no failures are detected by either steps 186 or 188 then the algorithm proceeds to step 190. Step 190 determines whether or not the lever 52 has been pulled all the way back for at least 100 milliseconds. If so, then the algorithm proceeds to step 192 which clears the UP mode and unlocks the lever (disables the lever lockout logic) and returns control to the main program. When step 192 is executed the main program responds by causing the hitch to move in response to movement of the lever 52, so that the hitch follows the lever 52. If the lever 52 has not been all the way back for at least 100 milliseconds, then step 190 returns control to the main program without unlocking the lever. Thus, the main program responds by preventing hitch movement until the lever 52 is moved all the way back or to a matching position matching the position of the hitch.

Figure 3I:
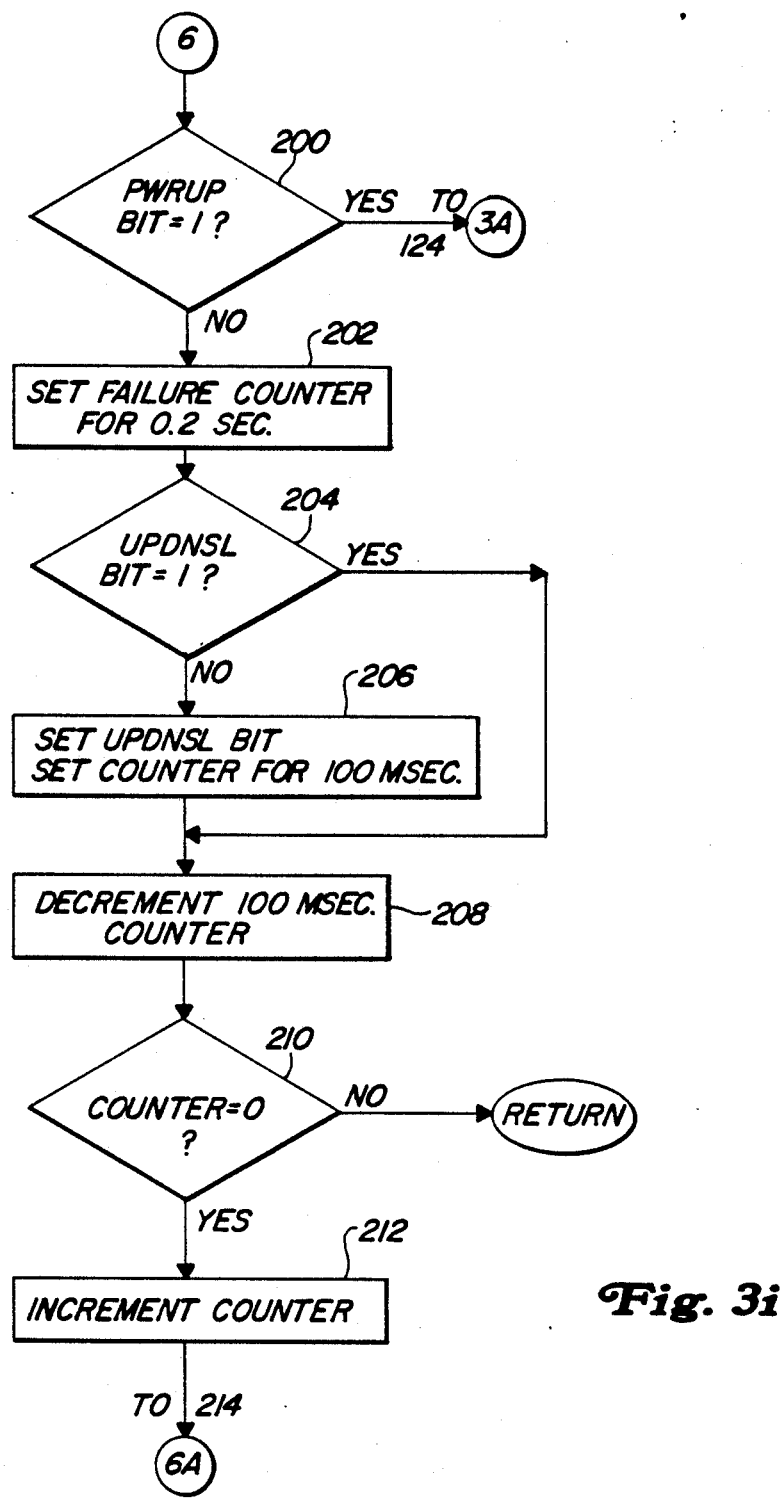

Returning now to FIG. 3b, if step 120 determines that the rocker switch is in the up position, then the algorithm is directed to step 200 of FIG. 3i. Step 200 directs the algorithm to the failure logic of step 124 if the rocker switch is found to be in its up position upon initial power-up of the system. Otherwise the algorithm proceeds to step 202 which resets the failure counter for the .2 second time period. Step 204 then directs the algorithm to step 208 if the "UPDNSL" bit was previously set to 1, indicating that the switch was previously in its up position. Otherwise, step 204 directs the algorithm to step 206 which sets the "UPDNSL" bit to indicate this is the first time that the rocker switch is in its up position and sets a counter for a 100 millisecond time period. Step 208 decrements the 100 millisecond counter, then step 210 returns control to the main program if this 100 millisecond counter has not timed out. If the 100 millisecond counter has timed out then step 210 directs the algorithm to step 212 which increments the counter and then to step 214. At this point it is established that the rocker switch 80 has been in its up position for at least 100 milliseconds.

Figure 3J:
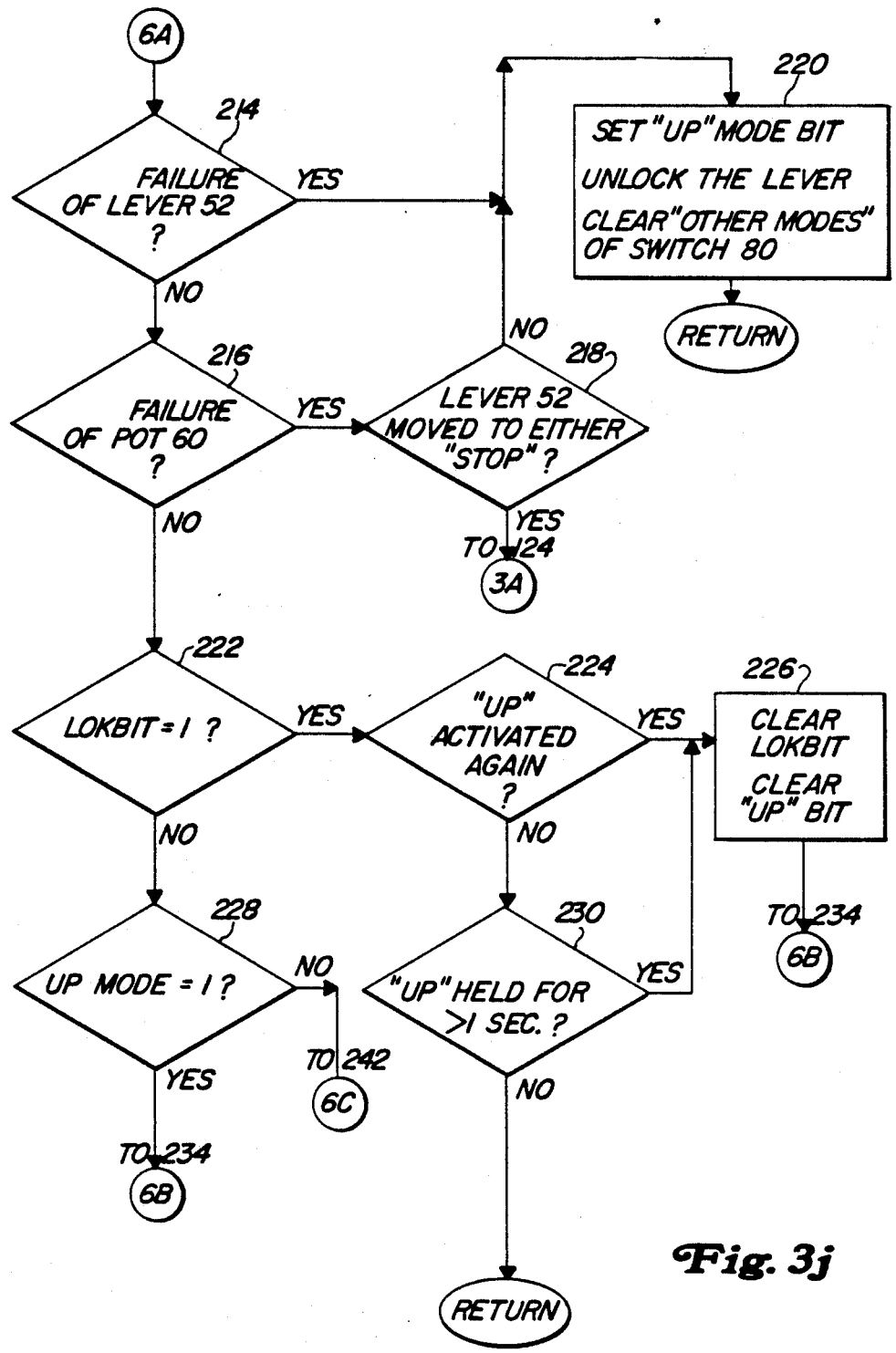

Referring now to FIG. 3j, steps 214 directs the algorithm to step 220 if a failure of the lever transducer 54 has been detected. Steps 220 sets the UP mode bit and unlocks the lever logic and clears the modes of the switch and returns control to the main program. This enables the system to operate in a "limp home" mode wherein the position of the hitch can be adjusted by toggling of the rocker switch 80. If there is no failure of the lever transducer 54 then the algorithm proceeds to step 216 which determines whether or not there has been a failure of the position feedback sensor 60. If so, the algorithm proceeds to step 218. Step 218 again directs the algorithm to step 220 if the lever 52 has not been moved to either of its stop positions. If so, step 218 directs the algorithm to the failure logic of step 124.

If no failure is detected by step 216, then the algorithm proceeds to step 222 which determines whether or not the LOKBIT bit has previously been set, such as by prior operation of step 248 as a result of the rocker switch previously being in its up position and then later moved into its down position. If the LOKBIT bit has been set to 1, then step 222 directs the algorithm to step 224 which determines whether this is the second time the switch 80 has been moved to the up position. If yes, then the algorithm proceeds to step 226 which clears the LOKBIT bit and clears the UP bit and then directs control to step 234. Returning to steps 222 and 224, if this is the first time the switch 80 has been in the up position after it was previously in the down position, then step 224 directs the algorithm to step 230. If the rocker switch remains in the up position for at least one second, then step 230 also directs the algorithm to 226 and clears the LOKBIT, clears the UP bit and sends the algorithm to step 234. If the rocker switch has not been in the up position for at least one second then the algorithm returns to the main program. Returning now to step 222, if the LOKBIT has not previously been set then 222 directs the algorithm to step 228 which determines whether the UP bit has previously been set.

Figure 3K:
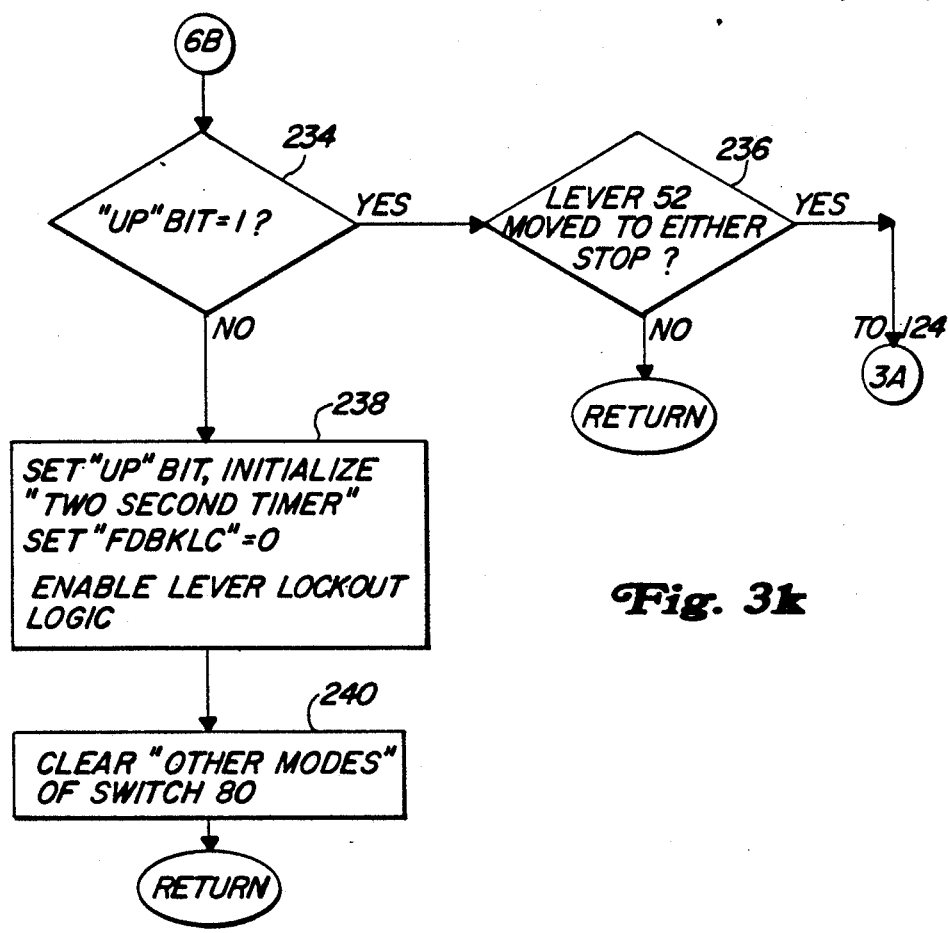
Figure 31:
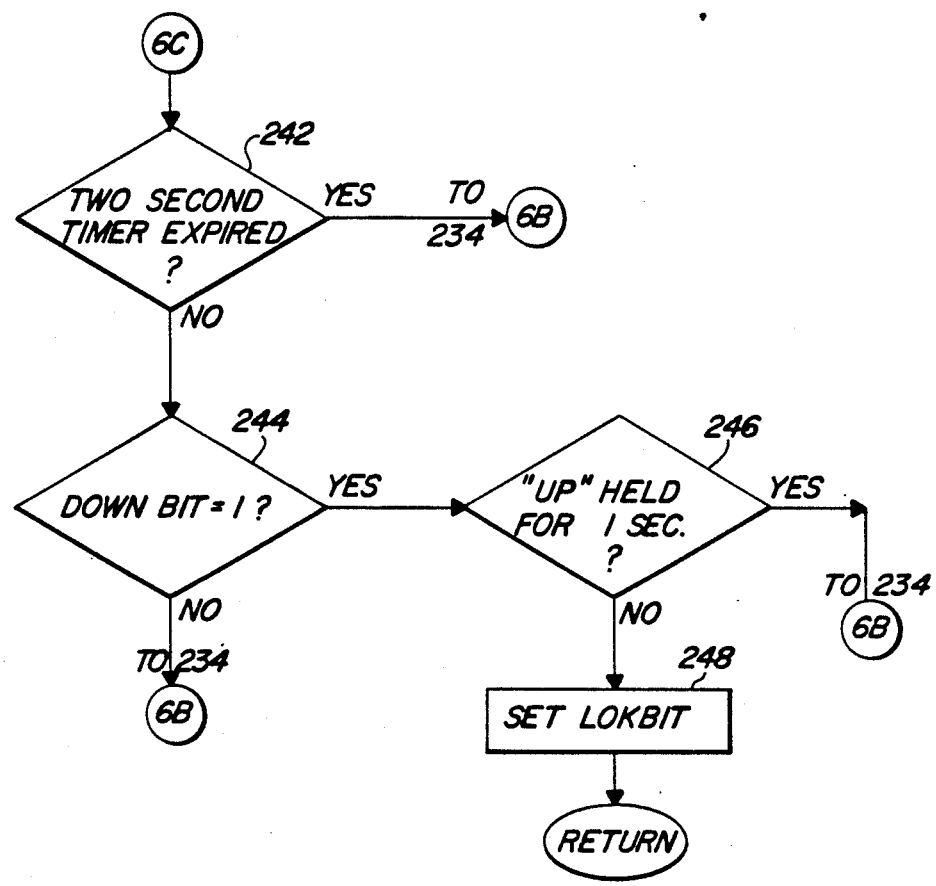

If the UP bit is not set, then step 228 will direct the algorithm to step 242 (FIG. 3l) and step 242 will direct the algorithm to step 244 if it has been less than 2 seconds since the last switch activity. Step 244 determines whether the DOWN bit has previously been set indicating that the rocker switch was in its down position, but then was moved to its up position within the last 2 seconds. If yes, then step 244 directs the algorithm to step 246. If the rocker switch has been in its up position for less than one second step 246 directs the algorithm to step 248 which sets the LOCK bit and enables the lever lockout logic and cancels the effect of any previous operation of the rocker switch 80 and returns control to the main program. Returning to step 246, if the rocker switch has remained in the up position for more than one second then step 246 directs the algorithm to step 234 (FIG. 3k). Returning to step 244 (FIG. 3l), if the DOWN bit was not previously set, then again the algorithm proceeds to step 234. Step 234 will branch to step 238 since the UP bit was not set. Step 238 will set the UP bit, set the lever lockout mode and set the lockout position to full up which will cause the hitch to raise.

Referring now to FIG. 3k, step 234 will be entered if the rocker switch has been held in its up position for at least one second, if the rocker switch has been toggled a second time or if the rocker switch is momentarily moved to its up position, but the switch has not previously been in its down position. Step 234 determines whether or not the UP bit as previously been set. If the UP bit was not previously set then the algorithm proceeds to step 238, which sets the UP bit, initializes the two second timer for the cancel feature and sets the "FDBKLC" value equal to zero. This causes the main program to move the hitch to its fully raised position. Step 238 also enables the lever lockout logic which prevents the main program from moving the hitch in response to movement of the lever 52. Step 238 then directs the algorithm to step 240 which clears the various rocker switch mode values and then returns control to the main program.

Returning now to step 234, once the UP bit has been set by execution of step 238 then in the next algorithm loop step 234 will direct the algorithm to step 236. If the lever 52 has been moved to either of its stop positions then step 236 directs the algorithm to the failure logic of step 124. If the lever has not been moved to one of its stop positions, then step 236 returns control to the main algorithm.

The algorithm just described implements various novel and desireable functions and features. For example, the hitch can be raised by a single momentary up toggling of the switch, and then lowered to a working position by the command lever 52 without further manipulation of the switch 80 because the switch 80 automatically returns to its center position when released and because steps 118 and 180–192 operate to enable the hitch to be moved in response to the command lever 52 if the rocker switch 80 is in its center position and the command lever 52 has been moved to its full back position. Steps 174–178 and 244–248 operate to cancel the effect of an earlier manipulation of the rocker switch 80 if the switch 80 is later manipulated in a different manner within two seconds of the earlier manipulation. Steps 130–136 cause the system to ignore switch manipulations which do not persist for at least a certain time period. Steps 122, 124, 166, 178, 198, 232, 238 and 218 operate to enable a lever lockout mode which prevents hitch movement in response to command lever movement. Steps 140–146 and 214–220 operate in response to failure conditions to permit the hitch to be moved to any desired position by manipulation of the rocker switch, whereas the rocker switch is normally effective only to move the hitch to its full up or full down positions.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In a vehicle having a hitch for attaching a ground engaging implement thereto, actuating means for raising and lowering the hitch, a sensor for sensing a parameter associated with the hitch, an operator-movable command member for setting a reference signal representing a desired value of the sensed parameter, an operator-movable input device and a control system for controlling operation of the actuating means as a function of the reference signal, the input device and the sensed parameter, the control system having means for moving the hitch only to a limit position in response to actuation of the input device sand means for adjusting the hitch to any one of a variety of desired working positions in response to manipulation of the command member, characterized by:

the input device comprising a spring-centered three position switch with a lifting position associated with a hitch raising operation, a working position associated with hitch ground working operation and a neutral position; and the control system having means for permitting the actuating means to move the hitch to one of the working positions in response to movement of the command member without the switch being in its working position.

2. The control system of claim 1, further comprising:

means for preventing a response to an earlier manipulation of the switch to one of its up and down positions if the switch is later manipulated to the other of its up and down positions within a certain time period of the earlier manipulation.

3. In a vehicle having a hitch for attaching a ground engaging implement thereto, actuating means for raising and lowering the hitch, a sensor for sensing a parameter associated with the hitch, an operator-controlled command member for setting a reference signal representing a desired value of the sensed parameter, an operator manipulatable input switch and a control system for controlling operation of the actuating means as a function of the reference signal, the input switch and the sensed parameter, characterized by:

the control system having means for causing the actuating means to move the hitch fully to a limit position in response to a momentary actuating of the input switch; and the control system having means for preventing a response to an earlier momentary manipulation of the input switch in a first manner if the input switch is later manipulated in a second different manner within a certain time period of said earlier manipulation.

4. The control system of claim 3, further comprising:

means for preventing a response to manipulation of the input switch unless the manipulation persists for at least a certain time period.

5. The control system of claim 3, wherein the control system further comprises:

a lock-out mode wherein the control system cooperates with the actuating means to prevent hitch movement in response to command member movement.

6. In a vehicle having a hitch for attaching a ground engaging implement thereto, actuating means for raising and lowering the hitch, an operator-movable command member, an operator-movable input device and a control system for controlling operation of the actuating means as a function of the command member, the input device and sensed parameters, the control system having means for moving the hitch only to a limit position in response to actuation of the input device and means for moving the hitch to any one of a variety of desired working positions in response to manipulation of the command member, characterized by:

the control system having means responsive to a failure condition for causing the actuating means to move the hitch to one of the working positions in response to manipulation of the input device.

7. In a vehicle having a hitch for attaching a ground engaging implement thereto, actuating means for raising and lowering the hitch, an operator-controlled command member, an operator manipulatable input switch and a control system for controlling operation of the actuating means as a function of the command member, the input switch and a sensed parameter, characterized by:

the control system having means for preventing a response to an earlier manipulation of the input switch in a first manner if the input switch is later manipulated in a second different manner within a certain time period of said earlier manipulation; and the control system further comprising a lock-out mode wherein the control system cooperates with the actuating means to prevent hitch movement in response to command member movement.

* * * * *